United States Patent
Ness et al.

(10) Patent No.: US 9,822,729 B2
(45) Date of Patent: Nov. 21, 2017

(54) ENGINE PISTON HAVING A NOTCHED TOP LAND

(71) Applicant: Caterpillar Inc., Peoria, IL (US)

(72) Inventors: Aaron Ness, Battle Ground, IN (US); John R. Brubaker, Battle Ground, IN (US)

(73) Assignee: Caterpillar Inc., Peoria, IL (US)

( * ) Notice: Subject to any disclaimer, the term of this patent is extended or adjusted under 35 U.S.C. 154(b) by 52 days.

(21) Appl. No.: 14/929,831

(22) Filed: Nov. 2, 2015

(65) Prior Publication Data

US 2017/0122251 A1    May 4, 2017

(51) Int. Cl.
*F02F 3/28* (2006.01)
*F02F 1/00* (2006.01)
*F16C 7/02* (2006.01)

(52) U.S. Cl.
CPC ............. *F02F 3/28* (2013.01); *F02F 1/004* (2013.01); *F16C 7/023* (2013.01)

(58) Field of Classification Search
CPC ........ F02F 3/00; F02F 3/24; F02F 3/12; F02F 3/28; F02F 5/00; F16J 9/22; F16J 9/12; F16J 1/02
USPC ....... 123/193.6, 193.1; 92/82, 208, 233, 182
See application file for complete search history.

(56) References Cited

U.S. PATENT DOCUMENTS

| | | | | |
|---|---|---|---|---|
| 3,463,057 A * | 8/1969 | Squinto | ...................... | F16J 9/08 92/182 |
| 3,542,376 A * | 11/1970 | Dykehouse | ................ | F16J 9/00 277/444 |
| 3,656,412 A * | 4/1972 | Wilson | .................. | F02B 75/044 123/48 B |
| 4,106,463 A * | 8/1978 | Curtis, Jr. | ................. | F02F 3/28 123/193.6 |
| 4,178,899 A * | 12/1979 | Julich | ........................ | F16J 1/02 123/193.6 |
| 4,346,685 A | 8/1982 | Fujikawa | | |
| 4,467,752 A | 8/1984 | Yunick | | |
| 4,622,929 A | 11/1986 | Blair | | |
| 5,267,505 A * | 12/1993 | Roper | ....................... | F02F 3/28 123/193.4 |
| 6,170,454 B1 * | 1/2001 | McFarland | ............... | F02F 3/28 123/193.6 |

(Continued)

FOREIGN PATENT DOCUMENTS

| CA | 2863036 | 10/2014 |
|---|---|---|
| DE | 19810883 A1 | 9/1999 |

(Continued)

*Primary Examiner* — Long T Tran (74) *Attorney, Agent, or Firm* — Finnegan, Henderson, Farabow, Garrett & Dunner LLP (57) ABSTRACT

A piston is disclosed. The piston may have a piston crown having a top surface. The piston may also have a first land disposed in the piston crown adjacent the top surface. The first land may have a side surface disposed generally orthogonal to the top surface. Further the piston may have a second land axially separated from the first land. In addition, the piston may have a groove disposed between the first land and the second land. The piston may also have a notch extending between the side surface and the top surface. The notch may have a generally concave shape and may extend circumferentially around the top surface.

13 Claims, 4 Drawing Sheets

(56) References Cited

U.S. PATENT DOCUMENTS

| | | | |
|---|---|---|---|
| 6,478,003 B2 * | 11/2002 | Laimbock | F02F 3/00 123/193.6 |
| 2003/0000494 A1 * | 1/2003 | Kremer | F02B 61/04 123/193.1 |
| 2004/0237775 A1 | 12/2004 | Dunaevsky et al. | |
| 2008/0135007 A1 * | 6/2008 | Storm | F02B 23/0654 123/143 C |

FOREIGN PATENT DOCUMENTS

| | | |
|---|---|---|
| JP | 3775038 | 8/1999 |
| WO | 02055848 | 7/2002 |

\* cited by examiner

ENGINE PISTON HAVING A NOTCHED TOP LAND

TECHNICAL FIELD

The present disclosure relates generally to an engine piston, and, more particularly, to an engine piston having a notched top land.

BACKGROUND

Internal combustion engines include one or more combustion chambers, each equipped with a piston connected via a connecting rod to a crankshaft. Combustion of fuel in the combustion chamber causes the piston to move in one direction within the combustion chamber, rotating the crankshaft. Rotation of the crankshaft in turn helps to drive the piston in an opposite direction within the combustion chamber. The piston typically includes annular grooves on its side wall. The grooves accommodate annular piston rings that separate the side wall of the piston from the inner walls of the combustion chamber.

During operation of the engine, some of the fuel or fuel-air mixture in the combustion chamber may enter the circumferential gap between the piston side wall and the combustion chamber inner wall. When the fuel or fuel-air mixture in the combustion chamber ignites, a flame front travels away from the location where the combustion initiated, consuming the fuel or fuel-air mixture in its path. The piston and the combustion chamber walls tend to conduct some of the heat released because of the combustion. Because of this heat loss, the flame front may not enter the gap between the piston side wall and the combustion chamber inner wall, leaving the fuel and/or fuel-air mixture trapped in the circumferential gap unburned. The unburned fuel or fuel-air mixture may exit the combustion chamber with the exhaust gases.

The fuel that remains unburned and escapes from the combustion chambers does not participate in combustion, reducing the efficiency of the engine. Additionally, the escaping unburned fuel contributes to the total amount of undesirable emissions produced by the engine. Although the unburned fuel may be combusted in an after-treatment device to prevent its discharge to the atmosphere, implementing these devices adds to the cost of operating the engine. Therefore, it is desirable to reduce the amount of unburned fuel that is discharged from the combustion chamber into the exhaust leaving the combustion chamber.

One technique for reducing the amount of unburned fuel in the combustion chamber is disclosed in Canadian Patent Application No. 2863036 A1 to Huang et al. ("the '036 application") that published on Oct. 29, 2014. The '036 application discloses a piston that has a chamfered edge extending from the top surface of the piston to the outer side surface. The '036 application discloses that the chamfer angle and the chamfer depth may be selected so as to reduce the amount of unburnt hydrocarbons, carbon monoxide, and NOx in the exhaust. The '036 application further discloses that although the amounts of unburned hydrocarbons and carbon monoxide decreased with the chamfered piston, the amount of NOx increased for all chamfer designs. In addition, the '036 application discloses that the amount of unburned hydrocarbons in the combustion chamber increased for some chamfer designs as compared to the unchamfered pistons.

Although the '036 application discloses the use of a chamfered piston to reduce the amount of unburned hydrocarbons in a combustion chamber, the disclosed piston may still not be optimal. In particular, the disclosed piston results in an increase in the amount of NOx. Moreover, for at least some chamfer geometries, the disclosed piston caused an undesirable increase in the amount of unburned hydrocarbons in the combustion chamber. It is likely that in these cases the shape of the chamfer did not allow the flame front to advance into the gap between the piston side wall and the inner wall of the combustion chamber.

The engine piston of the present disclosure solves one or more of the problems set forth above and/or other problems in the art.

SUMMARY

In one aspect, the present disclosure is directed to a piston. The piston may include a piston crown having a top surface. The piston may include a first land disposed in the piston crown adjacent the top surface. The first land may include a side surface disposed generally orthogonal to the top surface. The piston may also include a second land axially separated from the first land. Further, the piston may include a groove disposed between the first land and the second land. The piston may also include a notch extending between the side surface and the top surface. The notch may have a generally concave shape and may extend circumferentially around the top surface In another aspect, the present disclosure is directed to a cylinder pack. The cylinder pack may include a cylinder liner extending along a longitudinal axis. Further, the cylinder pack may include a piston reciprocatingly disposed within the cylinder liner. The piston may include a piston crown having a top surface. The piston may also include a first land disposed in the piston crown adjacent the top surface. The first land may have a side surface disposed generally orthogonal to the top surface. Further, the piston may include a second land axially separated from the first land. The piston may also include a groove disposed between the first land and the second land. In addition, the piston may include a notch extending between the side surface and the top surface. The notch may have a generally concave shape and may extend circumferentially around the top surface. The cylinder pack may include a connecting rod connected to the piston and connectable to a crankshaft.

DETAILED DESCRIPTION

Figure 1:
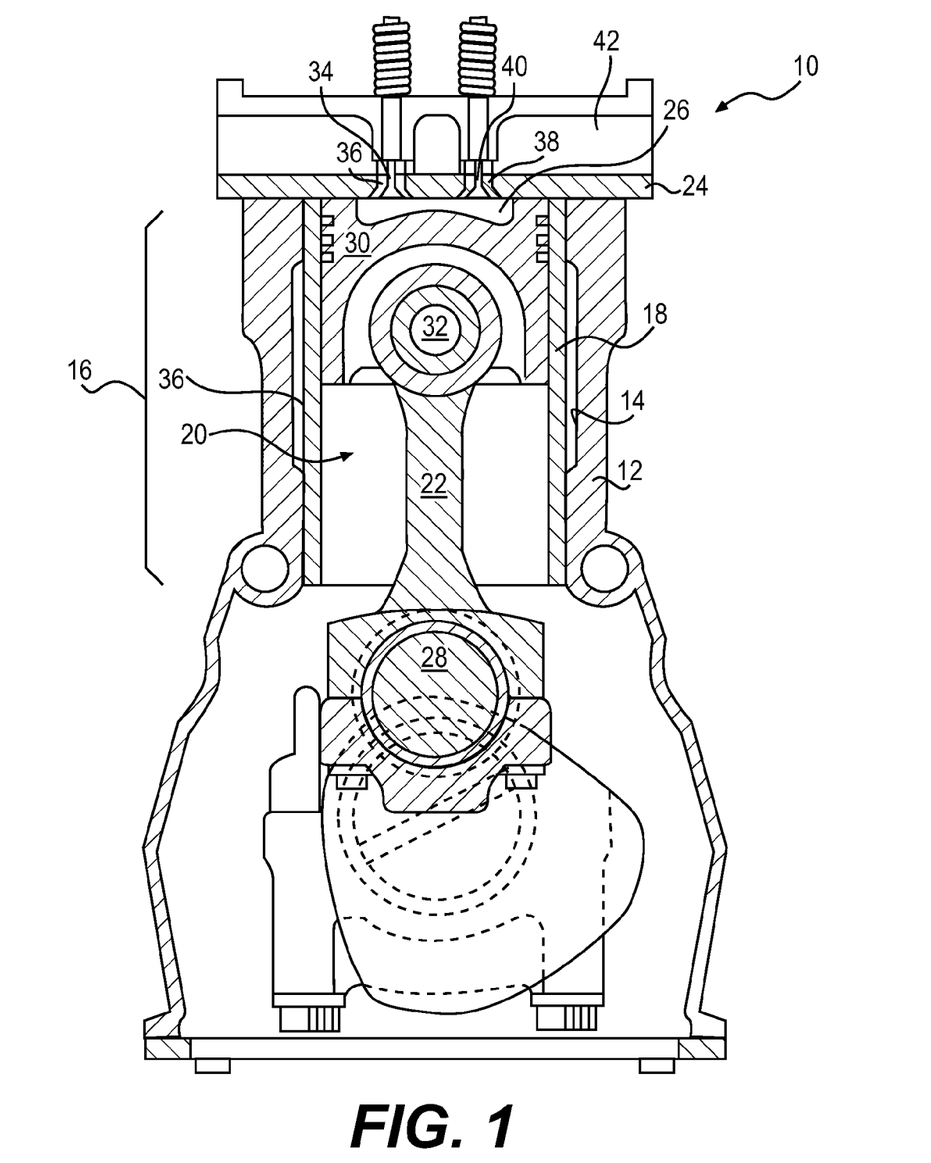
FIG. 1 is a diagrammatic illustration of an exemplary disclosed engine.

FIG. 1 illustrates an exemplary internal combustion engine 10. Engine 10 may be a four-stroke diesel engine. It is contemplated, however, that engine 10 may be any other type of internal combustion engine such as, for example, a dual-fuel powered two-stroke or four-stroke engine, a two-stroke diesel, gasoline, or gaseous-fuel-powered engine, or a four-stroke gasoline engine. Engine 10 may include, among other things, an engine block 12 that at least partially defines a cylinder 14 and a cylinder pack 16. Cylinder pack 16 may include liner 18, piston 20 slidably disposed within liner 18, and connecting rod 22. It is contemplated, however, that cylinder pack 16 may include cylinder 14 without a liner 18, piston 20 slidably disposed within cylinder 14, and connecting rod 22. Engine 10 may include cylinder head 24, which may be connected to engine block 12 to close off an end of cylinder 14 and/or liner 18. Piston 20 may be slidably disposed within liner 18 and, together with liner 18 and cylinder head 24, may define combustion chamber 26. In some exemplary embodiments, piston 20 together with cylinder 14 and cylinder head 24 may define combustion chamber 26. It is contemplated that engine 10 may include any number of cylinder packs 16 and combustion chambers 26. Moreover, cylinder packs 16 and combustion chambers 26 in engine 10 may be disposed in an "in-line" configuration, a "V" configuration, an opposing-piston configuration, or in any other suitable configuration.

Piston 20 may be configured to reciprocate between a bottom-dead-center (BDC) or lower-most position within liner 18, and a top-dead-center (TDC) or upper-most position. As also shown in FIG. 1, engine 10 may include crankshaft 28 rotatably disposed within engine block 12. Piston 20 may include piston crown 30 pivotally connected to connecting rod 22 via pin 32. Connecting rod 22 may be connectable to crankshaft 28. The reciprocal movement of piston 20 within liner 18 may be transferred to a rotational movement of crankshaft 28 by connecting rod 22. Similarly, the rotation of crankshaft 28 may be transferred as a reciprocating movement of piston 20 within liner 18 by connecting rod 22. As crankshaft 28 rotates through about 180 degrees, piston crown 30 and connecting rod 22 may move through one full stroke between BDC and TDC.

As the piston moves from the TDC to the BDC position, air may be drawn into combustion chamber 26 via one or more intake valves 34. In particular, as piston 20 moves downward within liner 18 away from cylinder head 24 one or more intake valves 34 may open and allow air to flow into combustion chamber 26. When intake valves 34 are open and a pressure of air at intake ports 36 is greater than a pressure within combustion chamber 26, air will enter combustion chamber 26 via intake ports 36. Intake valves 34 may be subsequently closed during an upward movement of piston 20. Fuel may be mixed with the air before, during, or after the air is drawn into combustion chamber 26.

As piston 20 moves from the BDC to TDC position, piston 20 may mix and compress the fuel and air within combustion chamber 26. As the mixture within combustion chamber 26 is compressed, a temperature of the mixture will increase. Eventually, the pressure and temperature of the mixture will reach a point at which the mixture combusts, resulting in an increase in temperature and pressure within combustion chamber 26. It is also contemplated that combustion in combustion chamber 26 may be initiated using a spark, glow plug, pilot flame, or by any other method known in the art.

As the piston moves from TDC towards BDC because of the increased pressure within combustion chamber 26, piston 20 may impart mechanical power to crankshaft 28. At a particular point during this downward travel, one or more exhaust ports 38 located within cylinder head 24 may open to allow pressurized exhaust within combustion chamber 26 to exit. In particular, as piston 20 moves downward within liner 18, piston 20 may eventually reach a position at which exhaust valves 40 move to fluidly communicate combustion chamber 26 with exhaust ports 38. When combustion chamber 26 is in fluid communication with exhaust ports 38 and a pressure of exhaust in combustion chamber 26 is greater than a pressure within exhaust ports 38, exhaust will exit combustion chamber 26 through exhaust ports 38 into exhaust manifold 42. In the disclosed embodiment, movement of intake valves 34 and exhaust valves 40 may be cyclical and controlled by way of one or more cams (not shown) that is mechanically connected to crankshaft 28. It is contemplated, however, that movement of intake valves 34 and exhaust valves 40 may be controlled in any other conventional manner, as desired. Although an operation of a four-stroke engine has been described above with respect to FIG. 1, it is contemplated that engine 10 may instead be a two-stroke engine.

Figure 2:
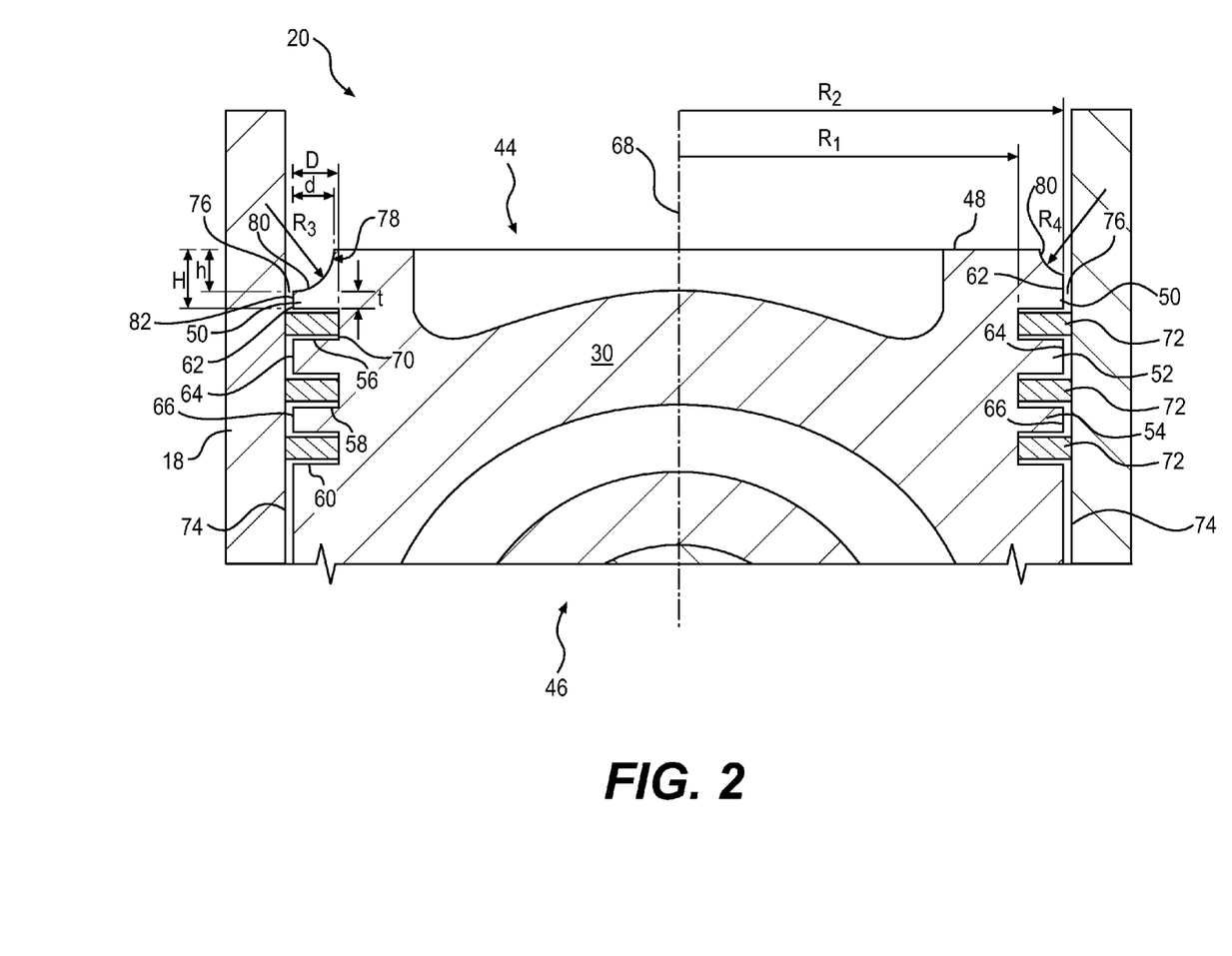
FIG. 2 is a diagrammatic illustration of an exemplary disclosed piston that may be used with the engine of FIG. 1.

FIG. 2 illustrates an exemplary piston 20 for use in conjunction with engine 10. Piston 20 may include piston crown 30 extending from head end 44 to crankshaft end 46. Piston crown 30 may include top surface 48 disposed adjacent head end 44. Piston crown 30 may also include one or more lands. For example, as illustrated in FIG. 2, piston crown 30 may include first land 50 (top land), second land 52 (intermediate land), and third land 54 (bottom land), which may be separated from each other by first groove 56, second groove 58, and third groove 60, respectively. In one exemplary embodiment as illustrated in FIG. 2, first land 50 may be a top land of piston crown 30. First land 50 may include first side surface 62, extending from top surface 48 towards crankshaft end 46. For example, as illustrated in FIG. 2, first side surface 62 may extend from top surface 48 to first groove 56. First side surface 62 may have a generally cylindrical shape and may be disposed generally orthogonal to top surface 48. It is contemplated, however, that first side surface 62 may have an oval or elliptical shape.

Second land 52 may include second side surface 64 extending from first groove 56 to second groove 58. Second side surface 64 may have a generally cylindrical shape and may be disposed generally orthogonal to top surface 48. It is contemplated, however, that second side surface 64 may have an oval or elliptical shape. Third land 54 may include third side surface 66 extending from second groove 58 to third groove 60. Third side surface 66 may have a generally cylindrical shape and may be disposed generally orthogonal to top surface 48. It is contemplated, however, that third side surface 66 may have an oval or elliptical shape. Liner 18, piston crown 30, first land 50 (or top land 50), second land 52, third land 54, and first, second, and third side surfaces 62, 64, 66 may be generally symmetrically disposed about longitudinal axis 68 of combustion chamber 26. First, second, and third side surfaces 62, 64, 66 may have the same or different radii relative to longitudinal axis 68. Although three lands 50, 52, 54 are illustrated in FIG. 2, it is contemplated that piston crown 30 may have fewer than or more than three lands 50, 52, 54. Likewise it is contemplated that piston crown 30 may have fewer than or more than three grooves 56, 58, 60.

First groove 56 may extend radially inward from first and second side surfaces 62, 64 of piston crown 30 to a radial width "D." First groove 56 may have groove wall 70, which may have a generally cylindrical shape disposed about longitudinal axis 68. Groove wall 70 may have a radius "$R_1$," which may be smaller than a radius "$R_2$" of first side surfaces 62 of piston crown 30. Second and third grooves 58, 60 may have geometries similar to that of first groove 56. It is contemplated, however, that second and third grooves 58, 60 may have geometries different from first groove 56. It is also contemplated that first, second, and third grooves 56, 58, 60 may have the same or different radial widths D. It is further contemplated that first, second, and third grooves 56, 58, 60 may have unequal radial widths. Seal rings 72 may be disposed within first, second, and third grooves 56, 58, 60. Seal rings 72 may slidably and sealably engage with inner surface 74 of liner 18.

First land 50 of piston crown 30 may extend between top surface 48 and first groove 56 disposed between first land 50 and second land 52. First groove 56 may be disposed at a depth "H" from top surface 48, as measured generally parallel to longitudinal axis 68. During the intake and/or compression stroke, some of the fuel and/or fuel-air mixture may enter gap 76 formed between first side surface 62 of first land 50, inner surface 74 of liner 18, and seal ring 72 in first groove 56.

As illustrated in FIG. 2, piston crown 30 may include notch 78 disposed in first land 50. Notch 78 may extend circumferentially around a periphery of top surface 48. As also shown in FIG. 2, notch 78 may have a generally concave shape, extending from first side surface 62 to top surface 48. In one exemplary embodiment, notch 78 may have a radial width "d" adjacent top surface 48. Radial width d of notch 78 may be the same as or different from radial width D of first groove 56. Notch surface 80 may intersect with first side surface 62 at a depth "h" from top surface 48, as measured generally parallel to longitudinal axis 68. Depth h of notch 78 may be smaller than depth H. First land 50 may include lip 82, having a thickness "t." In one exemplary embodiment, thickness t of lip 82 may range between about 2 mm to about 5 mm. As used in this disclosure, the terms "about" and "generally" indicate typical manufacturing tolerances and dimensional rounding. Thus, for example, the terms about and generally may represent dimensional variations of ±0.1 mm, angular variations of ±0.1°, etc.

In one exemplary embodiment as illustrated in FIG. 2, notch surface 80 may have a generally curvilinear cross-section in a radial plane of piston 20. Notch surface 80 may have a radius of curvature "$R_3$," which may be uniform or non-uniform around a circumference of top surface 48. For example, as illustrated in FIG. 2, notch surface may have a first radius of curvature $R_3$ at one radial location of piston crown 30, and a second radius of curvature "$R_4$" at a different radial location, for example, at a diametrically opposite location. Radius $R_3$ may be smaller than or larger than radius $R_4$. One of ordinary skill in the art would recognize that lip thickness t may also vary around a circumference of first land 50 when the radius of curvature $R_3$ of notch 78 varies circumferentially around top surface 48. In one exemplary embodiment, a ratio of the radius of curvature $R_3$ of notch 78 to radius $R_2$ of piston crown 30 may range between about 1:5 and 1:30. Notably, the presence of notch 78 in piston crown 30 may increase a volume of combustion chamber 26. The radius of curvature $R_3$ may be selected to ensure that an increase in the volume of combustion chamber 26 is less than a predetermined amount. In one exemplary embodiment, the predetermined amount may range from about 5% to about 10%.

Figure 3:
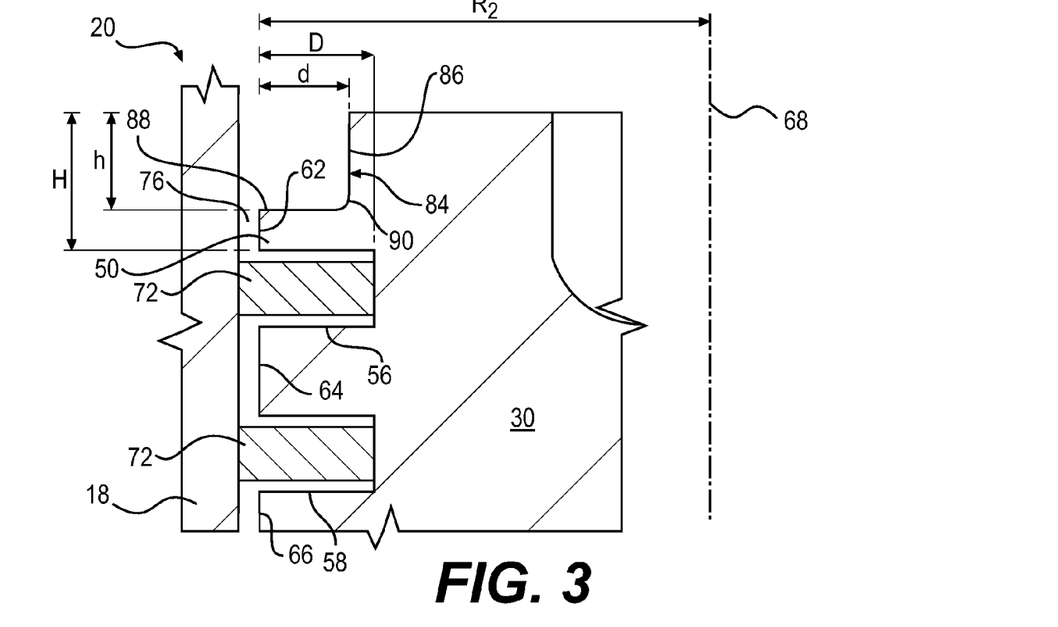
FIGS. 3-6 are diagrammatic illustrations of additional exemplary disclosed piston crowns that may be used in conjunction with the piston of FIG. 2.

FIG. 3 illustrates another exemplary piston crown 30 for use with piston 20. As shown in FIG. 3, piston crown 30 may include notch 84, having a generally concave shape. In one exemplary embodiment as shown in FIG. 3, notch 84 may have a generally rectangular cross-section in a radial plane of piston 20. Notch 84 may include notch side surface 86, which may extend from top surface 48 towards first groove 56. Notch side surface 86 may have a generally cylindrical shape and may be disposed generally orthogonal to top surface 48. Notch 84 may also include notch base 88, which may have a generally annular shape. Notch base 88 may extend from first side surface 62 of first land 50 to notch side surface 86. Notch base 88 and notch side surface 86 may be connected via fillet 90. Notch base 88 may be disposed generally parallel to top surface 48 and generally orthogonal to notch side surface 86.

Notch 84 may have a radial width d between first side surface 62 and notch side surface 86. Radial width d of notch 84 may be the same as or different from radial width D of first groove 56. Notch 84 may have an axial depth h adjacent first side surface 62 of first land 50. Axial depth h of notch 84 may be smaller than depth H. Width d and height h of notch 84 may be uniform or non-uniform along a circumference of top surface 48. In one exemplary embodiment, a ratio of width d of notch 84 to radius $R_2$ of piston crown 30 may range between about 1:5 and about 1:30. Width d and height h of notch 84 may be selected to ensure that an increase in the volume of combustion chamber 26 is less than a predetermined amount. In one exemplary embodiment, the predetermined amount may range from about 5% to about 10%.

Figure 4:
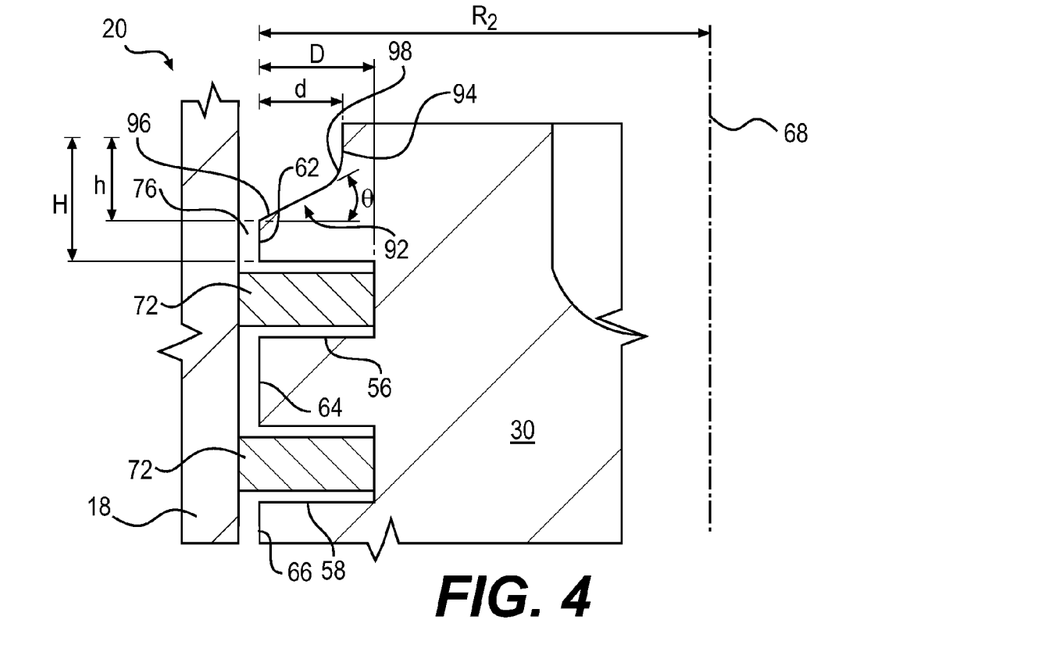

FIG. 4 illustrates another exemplary piston crown 30 for use with piston 20. As shown in FIG. 4, piston crown 30 may include notch 92, having a generally concave shape. Notch 92 may include notch side surface 94, which may extend from top surface 48 towards crankshaft end 46. Notch side surface 94 may have a generally cylindrical shape and may be disposed generally orthogonal to top surface 48. Notch 92 may also include notch base 96, which may have a generally frusto-conical shape. Notch base 96 may extend from first side surface 62 of first land 50 to notch side surface 94. Notch base 96 and notch side surface 94 may be connected via fillet 98. Notch base 96 may be generally inclined at an angle "θ" relative to top surface 48. One of ordinary skill in the art would recognize that when notch base 96 is inclined relative to top surface 48, notch base 96 will also be inclined relative to notch side surface 94.

Notch 92 may have a radial width d, adjacent top surface 48, between first side surface 62 of first land 50 and notch side surface 94. Radial width d of notch 92 may be the same as or different from radial width D of first groove 56. Notch 92 may have an axial depth h adjacent first side surface 62 of piston crown 30. Axial depth h of notch 92 may be smaller than depth H. Width d, height h, and angle θ of notch 92 may be uniform or non-uniform along a circumference of top surface 48. In one exemplary embodiment, a ratio of width d of notch 92 to radius $R_2$ of piston crown 30 may range between about 1:5 and about 1:30. In another exemplary embodiment, angle θ may range between about 5° and about 45°. Width d, height h, and angle θ of notch 92 may be selected to ensure that an increase in the volume of combustion chamber 26 is less than a predetermined amount. In one exemplary embodiment, the predetermined amount may range from about 5% to about 10%.

Figure 5:
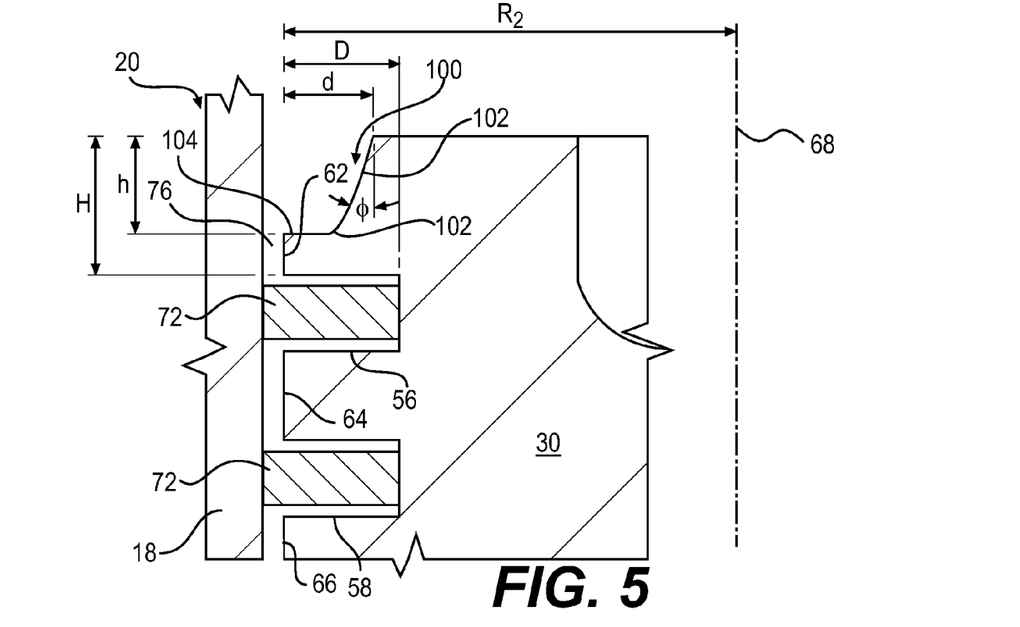

FIG. 5 illustrates another exemplary piston crown 30 for use with piston 20. As shown in FIG. 5, piston crown 30 may include notch 100, having a generally concave shape. Notch 100 may include notch side surface 102, which may extend from top surface 48 towards crankshaft end 46. Notch side surface 102 may have a generally frusto-conical shape and may be inclined at an angle "φ" relative to longitudinal axis 68. One of ordinary skill in the art would recognize that when notch side surface 102 is inclined relative to longitudinal axis 68, notch side surface 102 will also be inclined relative to top surface 48. Notch 100 may also include notch base 104, which may have a generally annular shape. Notch base 104 may extend from first side surface 62 of first land 50 to notch side surface 102. Notch base 104 and notch side surface 102 may be connected via fillet 106. Notch base 104 may be disposed generally parallel to top surface 48.

Notch 100 may have a radial width d, adjacent top surface 48, between first side surface 62 of first land 50 and notch side surface 102. Radial width d of notch 100 may be the same as or different from radial width D of first groove 56. Notch 100 may have an axial depth h adjacent first side surface 62 of piston crown 30. Axial depth h of notch 100 may be smaller than depth H. Width d, height h, and angle φ of notch 100 may be uniform or non-uniform along a circumference of top surface 48. In one exemplary embodiment, a ratio of width d of notch 100 to radius $R_2$ of piston crown 30 may range between about 1:5 and about 1:30. In another exemplary embodiment, angles φ may range between about 5° and about 45°. Width d, height h, and angle φ of notch 100 may be selected to ensure that an increase in the volume of combustion chamber 26 is less than a predetermined amount. In one exemplary embodiment, the predetermined amount may range from about 5% to about 10%.

Figure 6:
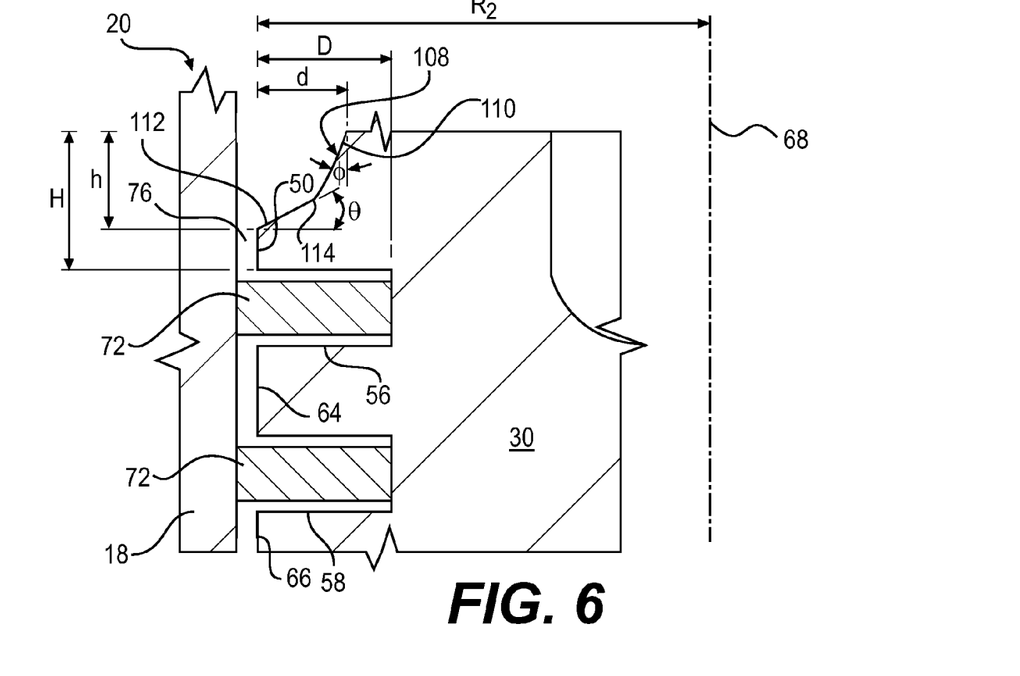

FIG. 6 illustrates another exemplary piston crown 30 for use with piston 20. As shown in FIG. 6, piston crown 30 may include notch 108, having a generally concave shape. Notch 108 may include notch side surface 110, which may extend from top surface 48 towards crankshaft end 46. Notch side surface 110 may have a generally frusto-conical shape and may be inclined at an angle "φ" relative to longitudinal axis 68. One of ordinary skill in the art would recognize that when notch side surface 110 is inclined relative to longitudinal axis 68, notch side surface 110 will also be inclined relative to top surface 48. Notch 108 may also include notch base 112, which may have a generally frusto-conical shape. Notch base 112 may extend from first side surface 62 of piston crown 30 to notch side surface 110. Notch base 112 and notch side surface 110 may be connected via fillet 114. Notch base 112 may be generally inclined at an angle "θ" relative to top surface 48. One of ordinary skill in the art would recognize that when notch base 112 is inclined relative to top surface 48, notch base 112 will also be inclined relative to longitudinal axis 68.

Notch 108 may have a radial width d, adjacent top surface 48, between first side surface 62 of piston crown 30 and notch side surface 110. Radial width d of notch 108 may be the same as or different from radial width D of first groove 56. Notch 108 may have an axial depth h adjacent first side surface 62 of piston crown 30. Axial depth h of notch 108 may be smaller than depth H. Width d, height h, angle θ, and angle φ of notch 108 may be uniform or non-uniform along a circumference of top surface 48. In one exemplary embodiment, a ratio of width d of notch 108 to radius $R_2$ of piston crown 30 may range between about 1:5 and about 1:30. In another exemplary embodiment, angle φ may range between about 5° and about 45°. In yet another exemplary embodiment, angle θ may range between about 5° and about 45°. Width d, height h, angle θ, and angle φ of notch 108 may be selected to ensure that an increase in the volume of combustion chamber 26 is less than a predetermined amount. In one exemplary embodiment, the predetermined amount may range from about 5% to about 10%. Although a variety of geometries of notch 108 have been illustrated in FIGS. 2-6, it is contemplated that notch 108 may have other geometrical shapes known in the art.

INDUSTRIAL APPLICABILITY

The engine of the present disclosure has applications in a variety of engine types including, for example, single-fuel or dual-fuel diesel engines and gasoline engines, and/or gaseous-fuel-powered engines. The disclosed piston may be implemented into any engine wherein it may be advantageous to help reduce an amount of unburned fuel and/or fuel-air mixture that exits the combustion chambers of the engine with the exhaust.

In engine 10, fuel may be mixed with the air before, during, or after the air is drawn into combustion chamber 26. A portion of the fuel and/or the fuel-air mixture may enter gap 76 between first side surface 62 of first land 50 and inner surface 74 of liner 18. An amount of fuel and/or fuel-air mixture that may enter gap 76 may depend on a variety of factors including, for example, size of gap 76, direction of fuel injection, amount and direction of swirl induced in the fuel-air mixture in combustion chamber 26 during the compression stroke, etc.

During the compression stroke the mixture within combustion chamber 26 may be compressed, which may cause a temperature of the mixture to increase. Eventually, the pressure and temperature of the mixture may reach a point at which the mixture may combust. Whether or not the fuel and/or fuel-air mixture in gap 76 may be burned during combustion may depend on a temperature of the fuel and/or fuel-air mixture in gap 76 during combustion. Because piston crown 30 and liner 18 may conduct heat away from the fuel and/or fuel-air mixture in gap 76 and from combustion chamber 26 in general, a temperature of the fuel or fuel-air mixture in gap 76 may depend on sizes of piston crown 30, liner 18, and combustion chamber 26. Notches 78, 84, 92, or 100 and in particular the shapes of notches 78, 84, 92, or 100 may help increase a space available for the flame front in combustion chamber 26 to enter gap 76, helping to ensure combustion of some or all of the fuel and/or fuel-air mixture in gap 76. By combusting some or all of the fuel and/or fuel-air mixture in gap 76, piston crown 30 with one of notches 78, 84, 92, or 100 may help ensure that an amount of unburned fuel that may exit combustion chamber 26 with the exhaust is reduced.

Sizes and shapes of notches 78, 84, 92, or 100 may be selected based on an amount of fuel or fuel-air mixture expected to be trapped in gap 76 and a temperature of the trapped fuel or fuel-air mixture in gap 76. For example, when a temperature in combustion chamber 26 is expected to be relatively high, the temperature of the trapped fuel or fuel-air mixture may also be relatively high making it more susceptible to combustion. In such cases, notches 78, 84, 92, or 100 may have relatively smaller sizes because the flame front may not need to enter deep into gap 76 to initiate combustion of the fuel and/or fuel-air mixture trapped in gap 76. Contrariwise, when a temperature in combustion chamber 26 is expected to be relatively lower, the temperature of the trapped fuel or fuel-air mixture may also be relatively lower making it less susceptible to combustion. In such cases, notches 78, 84, 92, or 100 may have relatively larger sizes because the flame front may need to enter into gap 76 to a larger extent to initiate combustion of the relatively cooler trapped fuel or fuel-air mixture in gap 76.

The sizes and shapes of notches 78, 84, 92, or 100 may also be selected based on, for example, the size of engine 10, its expected duty cycle, fuel type, fuel injection timing, and other information regarding the combustion chamber and flame front geometry. The amount of unburned fuel that may remain trapped between first side surface 62 of first land 50 and inner surface 74 of liner 18 may depend on the distribution of the fuel-air mixture within combustion chamber 26, an amount of swirl induced in the fuel-air mixture during compression, a direction of fuel injection, and a direction in which combustion may propagate within combustion chamber 26, etc. Varying the sizes of notches 78, 84, 92, or 100

(i.e. $R_1$, $R_2$, d, h, θ, and/or φ) around a circumference of top surface 48 may help ensure combustion of varying amounts of trapped unburned fuel around a circumference of top surface 48 of piston crown 30, without unduly increasing a volume of combustion chamber 26. By selecting the size and shape of notches 78, 84, 92, or 100, based on an expected temperature within combustion chamber 26 and on an expected distribution of the fuel and/or fuel-air mixture around a circumference of top surface 48, the disclosed piston 20 may help reduce an amount of unburned fuel in the exhaust. The disclosed piston 20 may do so while simultaneously maintaining or lowering other emissions, for example, carbon monoxide, NOx, etc., relative to a piston that does not include any of the disclosed notches 78, 84, 92, or 100.

It will be apparent to those skilled in the art that various modifications and variations can be made to the disclosed engine piston without departing from the scope of the disclosure. Other embodiments of the engine piston will be apparent to those skilled in the art from consideration of the specification and practice of the engine disclosed herein. It is intended that the specification and examples be considered as exemplary only, with a true scope of the disclosure being indicated by the following claims and their equivalents.

What is claimed is:

1. A piston, comprising:
   a piston crown having a top surface;
   a first land disposed in the piston crown adjacent the top surface, the first land having a side surface disposed generally orthogonal to the top surface; a second land axially separated from the first land;
   a groove disposed between the first land and the second land; and
   a notch extending between the side surface and the top surface, the notch having a generally concave shape and extending circumferentially around the top surface,
   wherein the notch has a generally curvilinear cross-section in a radial plane of the piston,
   wherein the notch has a radius of curvature that takes a predefined non-uniform form along a circumference of the top surface of the piston crown,
   wherein a depth of the notch in an axial direction of the piston crown varies along the circumference of the top surface of the piston crown,
   wherein a ratio of the non-uniform radius of curvature of the notch to a radius of the piston crown changes between about 1:5 and 1:30,
   wherein a first radius of curvature of the notch at a first position along the circumference of the top surface of the piston crown is less than a second radius of curvature of the notch at a second position diametrically opposed to the first position along the circumference of the top surface of the piston crown, and
   wherein the first land has a first thickness in the axial direction at the first position along the circumference of the top surface of the piston crown and a second thickness in the axial direction at the second position along the circumference of the top surface of the piston crown greater than the first thickness.

2. The piston of claim 1, wherein a first radial width of the notch adjacent the top surface is larger than a second radial width of the groove.

3. The piston of claim 1, wherein a first radial width of the notch adjacent the top surface is smaller than a second radial width of the groove.

4. The piston of claim 1, wherein the notch includes:
   a notch side surface extending from the top surface towards the groove, the notch side surface having a generally cylindrical shape; and
   a notch base disposed between the side surface and the notch side surface, the notch base having a generally annular shape.

5. The piston of claim 4, wherein the notch side surface is disposed generally orthogonal to the top surface, and the notch base is disposed generally parallel to the top surface.

6. The piston of claim 4, wherein the notch side surface is generally inclined relative to a longitudinal axis of the piston.

7. The piston of claim 6, wherein an angle of inclination of the notch side surface ranges between about 5° and about 45°.

8. The piston of claim 4, wherein the notch base is generally inclined relative to a plane disposed generally orthogonal to a longitudinal axis of the piston.

9. The piston of claim 8, wherein an angle of inclination of the notch base ranges between about 5° and about 45°.

10. The piston of claim 1, wherein the notch includes:
    a notch side surface extending from the top surface towards the groove, the notch side surface being generally inclined relative to a longitudinal axis of the piston; and
    a notch base disposed between the side surface and the notch side surface, the notch base being generally inclined relative a plane disposed generally orthogonal to the longitudinal axis of the piston.

11. The piston of claim 10, wherein a first angle of inclination of the notch side surface and a second angle of inclination of the notch base vary along a circumference of the top surface.

12. A cylinder pack, comprising:
    a liner extending along a longitudinal axis;
    a piston reciprocatingly disposed within the liner, the piston including:
      a piston crown having a top surface;
      a first land disposed in the piston crown adjacent the top surface, the first land having a side surface disposed generally orthogonal to the top surface;
      a second land axially separated from the first land;
      a groove disposed between the first land and the second land; and
      a notch extending between the side surface and the top surface, the notch having a generally concave shape and extending circumferentially around the top surface; and
    a connecting rod connected to the piston and connectable to a crankshaft,
    wherein the notch has a generally curvilinear cross-section in a radial plane of the piston,
    wherein the notch has a radius of curvature that takes a predefined non-uniform form along a circumference of the top surface of the piston crown,
    wherein a depth of the notch in an axial direction of the piston crown varies along the circumference of the top surface of the piston crown,
    wherein a ratio of the non-uniform radius of curvature of the notch to a radius of the piston crown changes between about 1:5 and 1:30,
    wherein a first radius of curvature of the notch at a first position along the circumference of the top surface of the piston crown is less than a second radius of curvature of the notch at a second position diametrically opposed to the first position along the circumference of the top surface of the piston crown, and wherein the first land has a first thickness in the axial direction at the first position along the circumference of the top surface of the piston crown and a second thickness in the axial direction at the second position along the circumference of the top surface of the piston crown greater than the first thickness.

13. The cylinder pack of claim 12, wherein the notch includes:
  a notch side surface extending from the top surface towards the groove, the notch side surface having a generally cylindrical shape; and
  a notch base disposed between the side surface and the notch side surface, the notch base having a generally annular shape.

\* \* \* \* \*